US006269873B1

(12) United States Patent
Gautier et al.

(10) Patent No.: US 6,269,873 B1
(45) Date of Patent: Aug. 7, 2001

(54) METHOD FOR CONTROLLING HEAT EXCHANGE IN A NUCLEAR REACTOR

(75) Inventors: Guy-Marie Gautier; Patrick Aujollet, both of Pertuis; Jean-François Pignatel, Jouques, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/326,886

(22) Filed: Jun. 7, 1999

Related U.S. Application Data

(63) Continuation-in-part of application No. 08/538,576, filed on Oct. 3, 1995, now abandoned.

(30) Foreign Application Priority Data

Oct. 5, 1994 (FR) .................................................. 94 11902

(51) Int. Cl.[7] ...................................................... G21C 9/00
(52) U.S. Cl. ............................ 165/275; 165/96; 165/275; 165/301; 165/302; 165/132; 376/298; 376/299; 976/DIG. 196
(58) Field of Search ............................. 165/96, 96 HV, 165/96 HP, 274, 295, 276, 301, 302, 275, 132; 376/211, 299, 298; 976/DIG. 196

(56) References Cited

U.S. PATENT DOCUMENTS

| 1,117,444 | * | 11/1914 | Robinson .................... 165/96 HV |
| 1,671,686 | * | 5/1928 | Smoot ............................. 165/295 |
| 1,908,932 | * | 5/1933 | TIburtius .......................... 165/96 |
| 3,190,808 | * | 6/1965 | Dodd ....................... 976/DIG. 196 |
| 3,285,824 | * | 11/1966 | Ageron ............................ 376/298 |
| 3,327,772 | * | 6/1967 | Kodaira ........................... 165/274 |
| 3,506,539 | * | 4/1970 | Rigg ....................... 976/DIG. 196 |
| 3,929,567 | * | 12/1975 | Schabert et al. ........... 976/DIG. 196 |
| 3,982,586 | * | 9/1976 | Ruble ............................. 165/96 H |
| 4,526,742 | * | 7/1985 | Hannerz ........................... 376/282 |
| 4,583,552 | * | 4/1986 | Grossman ........................ 165/274 |
| 4,728,481 | * | 3/1988 | Geetz ............................... 376/211 |
| 4,832,898 | * | 5/1989 | Miranda .......................... 376/211 |
| 5,202,083 | * | 4/1993 | Spinks et al. .................... 376/299 |
| 5,217,682 | * | 6/1993 | Spinks ............................. 376/298 |
| 5,303,274 | * | 4/1994 | Sawyer ............................ 376/299 |
| 5,579,355 | * | 11/1996 | Leidemann et al. ............. 376/299 |

FOREIGN PATENT DOCUMENTS

| 950517 | * | 2/1964 | (GB) .......................... 165/96 HV |
| 1529037 | * | 12/1989 | (SU) .......................... 165/96 HV |

\* cited by examiner

*Primary Examiner*—John K. Ford
(74) *Attorney, Agent, or Firm*—Anderson, Kill & Olick P.C.

(57) ABSTRACT

A method for controlling heat exchange in a nuclear reactor. The reactor contains at least one thermal valve, at least one heat exchanger having a coolant flowing therein, with the heat exchanger being immersed in a pool containing a fluid. The heat exchanger is confined by a container having an upper part with an opening therein and a lower part having means for introducing the fluid through such lower part as well as means for partially or totally opening or closing said opening in the upper part and means for partially or totally opening or closing opening in the lower part. The method comprises the steps of closing the opening in the upper part of the container to thereby vaporize said fluid, in order to cause a cessation of heat exchange between the coolant and the fluid; and opening the opening in the upper part of the container to thereby cause the fluid to be heated and to rise by convection, thereby permitting heat exchange to occur between the coolant and the fluid.

14 Claims, 6 Drawing Sheets

METHOD FOR CONTROLLING HEAT EXCHANGE IN A NUCLEAR REACTOR

REFERENCE TO RELATED APPLICATION

This application is a continuation-in-part of application Ser. No. 08/538,576, filed Oct. 3, 1995 abandoned.

FIELD OF INVENTION

The invention pertains to a method for controlling the heat flux through a heat exchanger immersed in a pool with the aid of a thermal valve. Although the process and apparatus described below can be used in numerous fields, they are particularly useful in respect to the control of heat in a nuclear reactor from which it is desired to remove residual power.

BACKGROUND OF THE INVENTION

It is useful to understand what is meant by the residual power of a nuclear reactor. When a nuclear reactor is shutdown by introducing a source of high counter reactivity into the core, the number of fissions in the core very rapidly is reduced to a negligible number within a few seconds. However, the radioactive fission products produced in the core of the reactor during normal operation continue to produce a significant amount of power which can amount to several percent of the normal power production of the reactor. Regardless of the cause or the manner in which shutdown is effected, it is necessary to remove such residual power by a reliable means in order to prevent excessive heating of the core, which could lead to shutdown.

Numerous devices exist in the prior art for removing the residual power of a nuclear reactor. These devices are generally characterized as having one or more auxiliary loops, in parallel or branched from the main loops which extract heat from the reactor during normal operation. The auxiliary loops are used for the removal of the residual power only when the reactor is shutdown. The heat emitted by the reactor core is consequently extracted into a cold source by two types of circuits, one constituted by main loops for normal operation and the other constituted by auxiliary loops for shutdown operation and removal of the residual power. Such circuitry requires a system to permit the routing of the heat flux to the appropriate heat source. Typically, such routing takes place by closing or opening mechanical valves on the circuits. A typical prior art system is shown in FIG. 1 which is described below.

SUMMARY OF THE INVENTION

The invention pertains to a method for controlling heat exchange in a nuclear reactor. The nuclear reactor contains:

(a) at least one thermal valve;
(b) at least one heat exchanger having a coolant flowing therein; the heat exchanger is immersed in a pool containing a fluid;
(c) a container confining the heat exchanger; the container has an upper part with an opening therein and a lower part having means for introducing the fluid through the lower part; and
(d) means for partially or totally opening or closing the opening in the upper part and means for partially or totally opening or closing the opening in the lower part.

The method for controlling the heat exchange in the above-described nuclear reactor comprises two steps:

1. closing the opening in the upper part to thereby vaporize the fluid, in order to cause a cessation of heat exchange between the coolant and the fluid; and 2. opening the opening in the upper part to thereby cause the fluid to be heated and to rise by convection, thereby permitting heat exchange to occur between the coolant and the fluid.

DESCRIPTION OF THE INVENTION

Figure 1:
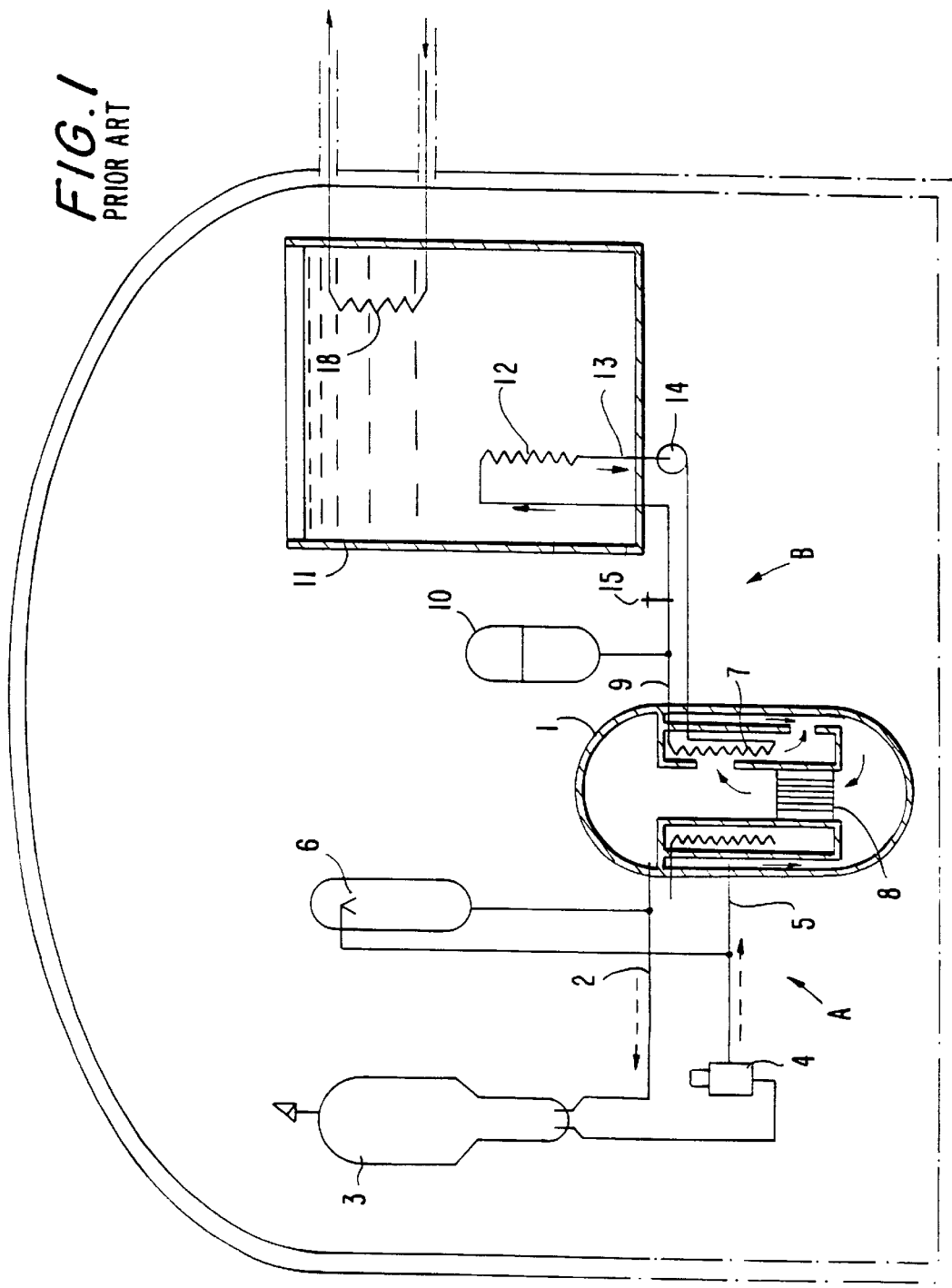
FIG. 1 is a cross-sectional view of a prior art pressurized water reactor residual power evacuation system.

The present invention relates to a method for controlling heat exchange, particularly heat exchange in a nuclear reactor, typically of the pressurized water type. In contradistinction to prior art methods which involve the opening and closing of mechanical valves on the pipes, the method of the present invention utilizes a different type of device which makes it possible to modify the heat exchange conditions at the exchanger in the pool in which the heat exchanger is immersed. The method of the present invention makes it possible to eliminate valves on the circuit and thereby increases reliability.

More particularly, the present invention relates to a method for controlling a heat exchange system by means of a thermal valve. The system comprises at least one heat exchanger immersed in a pool containing a fluid. Present in the pool is a container which confines the heat exchanger(s); the container has at least one opening in an upper part and means for introducing the fluid though a lower part of the container. Also present are means for partially or totally opening or closing the opening in the upper part of the container as well as means for partially or totally opening or closing the means for introducing the fluid through the lower part of the container.

When the heat exchanger is connected to a loop through which a coolant flows, the use of the thermal valve eliminates the need for any mechanical valves to control the coolant flow in the loop. Thus, the thermal valve employed in the method of the present invention will control the heat exchange between the coolant in the loop and the fluid of the pool confined in the container.

In order to prevent heat exchange from occurring, the upper opening of the container or the fluid introduction means in the lower part of the container is closed and the fluid of the pool confined within the container is heated by the exchanger and then commences boiling, thereby generating vapor or steam within the container. Heat exchange between the exchanger is then significantly decreased almost to the point of total cessation of the heat exchange. In order to permit re-occurrence of the heat exchange, the upper opening of the container or the fluid introduction means in the lower part of the container is opened.

According to one embodiment of the invention, one or more valves are present at an outlet of the opening of the upper part of the container. Indeed, there may be several valves arranged in parallel at the outlet of the opening of the upper part of the container. In addition, a bell can be disposed above such valve(s) so that the outlet of each valve is positioned above the lower edge of the bell.

The means for introducing the fluid through a lower part of the container may comprise one or more openings created in the lower part of the container by one or more tubes for supplying fluid to lower part of the container.

According to another embodiment of the invention, one or more valves are positioned either directly at the inlet of the opening(s) made in the lower part of the container or on the tube(s) for supplying the fluid to the lower part of the container. The thermal valve employed in the method of the invention can thereby also have means for preventing an entry of fluid through the opening made in the upper part of the container.

The thermal valve may also be provided with means for preventing an entry of fluid through the opening made in the upper part of the container.

DETAILED DESCRIPTION OF THE DRAWINGS AND THE PREFERRED EMBODIMENTS OF THE INVENTION

FIG. 1 depicts a prior art assembly for removal of residual power from a pressurized water reactor, having as its cold source a heat exchanger immersed in a pool. This cold source is based on reactors described in the literature such as AP600 or SIR (Safe Integral Reactor).

FIG. 1 shows the vessel 1 of a pressurized water reactor and one of the main loops A of the primary circuit constituted by a hot branch 2, the vapor or steam generator 3, the pump 4 and the cold branch 5. A pressurizer 6 is located on the hot branch of one of the main loops. A heat exchanger 7 is placed within vessel 1 for evacuating the residual power produced by the core 8.

Heat exchanger 7 forms part of a loop B having a hot branch 9 on which is disposed an expansion tank 10. Branch 9 penetrates a pool 11 filled with water and supplies a heat exchanger 12 disposed in pool 11. Discharge from heat exchanger 12 occurs by means of a pipe 13 which forms the cold branch and which returns to heat exchanger 7. Therefore, the cold source for removing the residual power from core 8 comprises the immersed heat exchanger 12.

Typically, heat exchanger 12 comprises a bundle of tubes having a downward flow. Other types of heat exchangers can also be used, e.g. heat exchangers containing inverted U-tubes, bayonet tubes or plate tubes. Pump 14 on pipe 13 is not indispensable, but is advantageous in that it improves convection in loop B. However, pump 14 may be eliminated if natural convection is adequate.

Loop B is only used for the removal of low levels of power, such as residual power, when such removal becomes necessary. Therefore, one or more valves are typically placed on loop B in order to check and control the flow rate of the coolant in the loop. For simplicity, only one mechanical valve 15 on branch 9 is shown in FIG. 1. Thus, valve 15 is generally closed down during normal operation and is opened when the reactor is shutdown, so as to permit a flow of coolant in loop B necessary for removal of the residual power from core 8.

The main disadvantage of the system shown in FIG. 1 is that high thermal stresses are present which can damage the system. Thus, in the case of electrogenic nuclear reactors, the temperature of the water in vessel 1 is generally close to 300° C. under high pressure conditions (approximately 150 bar for a pressurized water reactor), whereas that present in pool 11 is about 20–40° C. at a pressure close to atmospheric pressure.

When valve 15 is closed, one of the branches of loop B is in contact with a hot zone, in this case heat exchanger 7, while the remaining branch is in contact with a cold zone, in this case heat exchanger 12. Thus the loop has two zones at significantly different temperatures, i.e., a hot zone at about 300° C. and a cold zone at about 40° C. If the coolant is water, which is generally the case in pressurized water reactors, there is a risk of partial vaporization of the coolant due to the internal pressure of the loop. This is particularly the case if the pressure in the loop is too low, thereby entailing the use of multiple valves on the loop (which are not shown in FIG. 1). Loop B participates in the residual power removal from core 8, and therefore possesses a critical safety function. Any complexity in loop B serves to reduce the reliability of the loop.

When opening one or more of valve(s) 15, the displacement of the coolant creates thermal shocks on the components of the system due to the cold and hot locks present in the loop when the valve(s) is (are) closed. If the fluid in loop B is of a two-phase nature, on startup, considerable oscillations of the fluid can occur as a result of the sudden condensation of vapor locks on the cold walls. Such oscillations are clearly disadvantageous for the operation of the system and can create locally significant thermal stresses on the components of the system.

Figure 2:
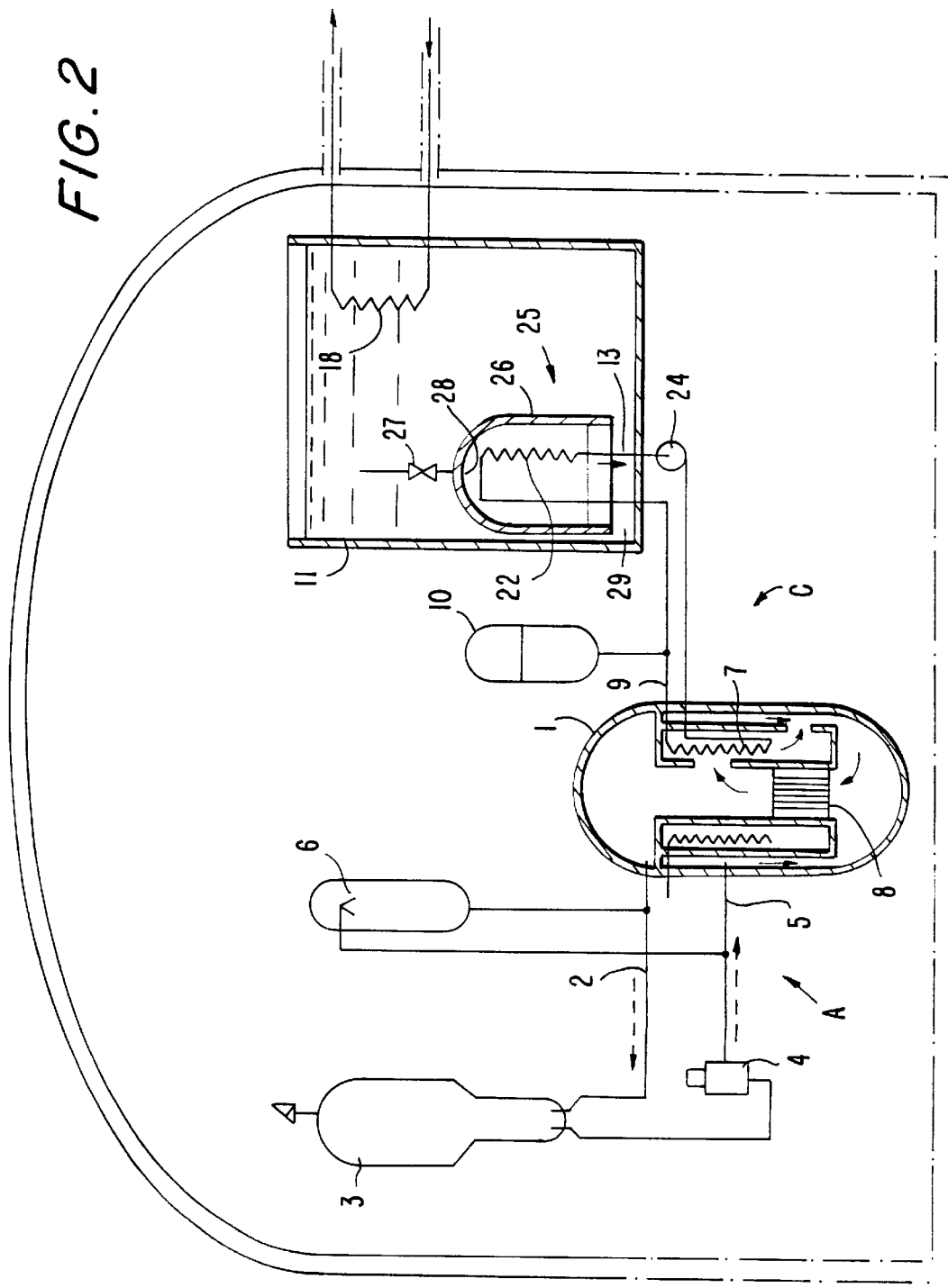
FIG. 2 is a cross-sectional view of a pressurized water reactor residual power evacuation system of a first embodiment of the invention.

In FIG. 2, reference numerals identical to those in FIG. 1, designate the same components. Thus, FIG. 2 illustrates reactor core 8 and the heat exchanger 7 for removal of residual power, as described above with reference to FIG. 1. However, in FIG. 2, mechanical valve 15 and been eliminated and replaced by thermal valve system 25 whose components and mode of operation are described below.

Thermal valve system 25 possesses a container 26 in the form of an inverted tank or "bell", positioned above, and confining, heat exchanger 22. In the upper part of container 26, there is located one or more openings 28 by which vapor or steam can escape; the escape of the vapor or steam may be controlled by valve 27 positioned above opening 28. In normal operation, of a nuclear reactor, fluid flowing in loop C is maintained under pressure and its temperature is generally in the range of about 250 to 330° C. The water in pool 11 is at a pressure close to atmospheric pressure and at a low temperature of about 20 to 40° C. To the extent necessary, heat exchanger 18 cools the water in pool 11.

The system employed in the method of the present invention functions as a "thermal valve" in that it controls the heat exchange between the hot water in loop C and the cold water of pool 11. Thus, when cessation of heat exchange is desired, valve 27 is closed and the water of the pool confined beneath bell 26 is heated by heat exchanger 22 and boils, thereby forming a vapor cushion beneath bell 26. The excess liquid water forced back by the vapor cushion returns to pool 11, passing beneath bell 26, by means of opening 29 at the base (or lower part thereof), e.g., in the form of a ring. Heat exchanger 22 is then in a gaseous atmosphere mode, thereby sharply reducing further heat exchange.

In order to allow heat exchange to resume, it is merely necessary to open valve 27. The vapor trapped by bell 26 escapes through opening 28 and valve 27 into the water of pool 11 and enables the cold water in pool 11 to enter inverted tank 26 through opening 29. This cold water contacts heat exchanger 22 and is heated. A natural convection is established in pool 11 between the hot source (heat exchanger 22) and the cold source (water of pool 11) through valve 27. In order to insure an adequate amount of convection, opening 28 and valve 27 are appropriately sized. Optionally, several valves in parallel may be installed to increase the size of the opening. If the temperature in bell 26 approaches the saturation temperature, heat transfer takes place by boiling therein adjacent to heat exchanger 22.

The uniqueness of such a "thermal valve" system is that it eliminates the need for valves on loop C between heat exchanger 7 and heat exchanger 22 and it permits a permanent temperature conditioning of loop C. Such conditioning is accomplished either by force convection with the aid of pump 24, or natural convection with a slight flow rate in loop C at a substantially uniform temperature, thereby avoiding any thermal stresses on the components and pipes of the system.

Note that in the embodiment described in respect to FIG. 2, the concept of the "thermal valve" has been applied to heat exchanger 22 on independent loop C containing a single-phase fluid kept under pressure by expansion tank 10.

Figure 3:
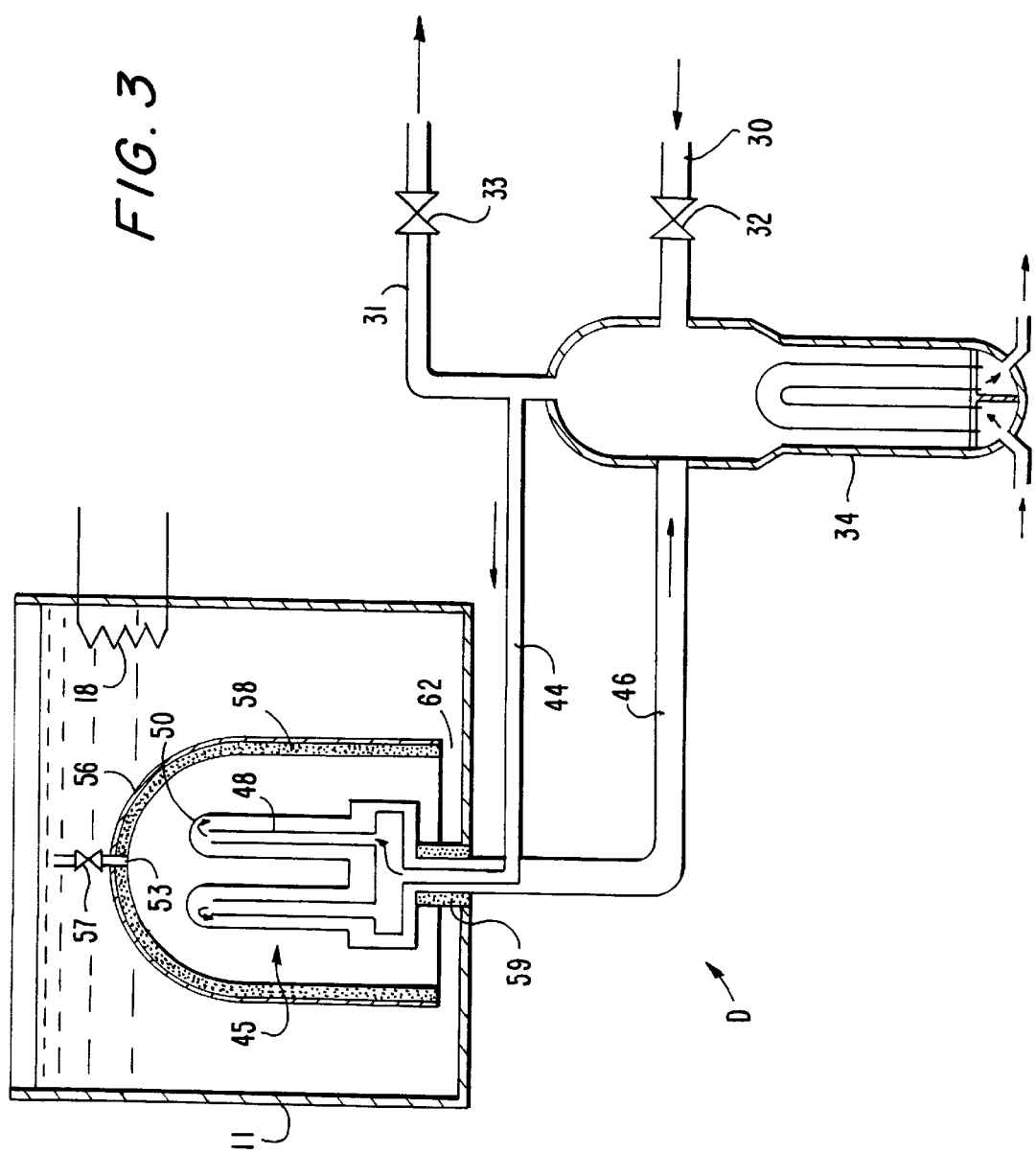
FIG. 3 is a cross-sectional view of a pressurized water reactor residual power evacuation system of a second embodiment of the invention in which an auxiliary loop of a main circuit is shown.

In FIG. 3, a further exemplified application of the concept of the "thermal valve" will be described with reference to a loop branched in respect to a main loop and with a two-phase fluid. In FIG. 3, the "thermal valve" is not applied to a single independent loop (such as loop C in FIG. 2) but to a loop D branched to the main supply loop of a steam or vapor generator of a nuclear reactor.

FIG. 3 shows a steam generator 34 of the inverted U-tube type which is used in many electrogenic nuclear reactors, with its water supply pipe 30 and steam or vapor outlet tube 31 (to a turbine which is not shown). Valves 32 and 33 are disposed on tubes 30 and 31, respectively, thereby making it possible to isolate steam generator 34, if a situation so requires such isolation. The main loop is constituted by pipe 30, steam generator 34 and pipe 31. An auxiliary loop D is constituted by a pipe 44 connected to pipe 31, a heat exchanger 45 and a return pipe 46 to steam generator 34.

In the system shown in FIG. 3, heat exchanger 45 is constituted by bayonet tubes, e.g. two coaxial tubes. Central tube 48 carries the incoming fluid which, in this case, is the steam which exits steam generator 34. External tube 50, closed at one end, is used for return of the fluid and permits heat exchange to occur. This particular type of heat exchanger is employed is various types of prior art processes and will not therefore be described in any further detail. Suffice it to say, this type of heat exchanger is depicted for exemplary purposes and is not indispensable for the use of the "thermal valve" employed in the method of the present invention and other types of heat exchangers may also be used.

Heat exchanger 45 is located in pool 11 containing a liquid which, for exemplary purposes is water. Heat exchanger 45 is surmounted by container 56 in the form of an inverted tank or bell and having in an upper part thereof, an opening 53 and a valve 57. Heat exchanger 18 makes it possible to maintain the desired temperature in pool 11. In normal operation, i.e., when heat is transmitted to the turbine to produce electricity and no heat is transmitted through loop D, valve 57 is closed and valves 32 and 33 are open. Pressurized steam exiting steam generator 34 at a temperature of about 250 to 300° C. is supplied to the turbine through pipe 31 and part of such steam is transmitted to heat exchanger 45 by means of pipe 44. Since valve 57 is closed, the water confined beneath bell 56 undergoes a temperature rise and is transformed into steam at about 100° C. (such temperature is dependent on the pressure of the water in pool 11, which is, e.g., 1 bar). The remaining liquid water is then discharged into pool 11 through the lower opening 62 of bell 56. When heat exchanger 45 contains only steam confined beneath bell 56, heat exchange ceases. Thus, all the heat produced by steam generator 34 is directed to the turbine.

If an operational situation requires an extraction of power through loop D, particularly when the main loop is unavailable with valves 32 and 33 closed, it is merely necessary to open valve 57 above bell 56. Steam contained in bell 56 will then escape via valve 57 and condenses in pool 11. The water level rises in bell 56 and again submerges the tube bundle in heat exchanger 45, thereby permitting heat exchange to occur. Steam transmitted from steam generator 34 via pipe 44 then condenses in heat exchanger 45 and returns to steam generator 34 via pipe 46.

The significance of the method of the invention which makes use of the "thermal valve" concept is that it eliminates the need to utilize valves on auxiliary loops and keeps such loops constantly hot. On auxiliary loops shown in the prior art, there is generally at least one valve located on each such auxiliary loop in order to block the circulation of fluid with in the loop. Due to the temperature levels (i.e. 250 to 300° C. for the hot fluid and 20 to 50° C. for the cold fluid of the pool), only a limited amount of natural convection can occur with the same pipe, thereby resulting in thermal gradients which can significantly impair the reliability of the system components.

In the method of the present invention, the thermal gradient is transferred to a gaseous volume having poor heat exchange capability. Mechanical valves are no longer necessary and the loop which is kept constantly hot by a slight flow leakage, is no longer subject to deleterious thermal gradients.

In order to reduce heat leakage when bell 56 is filled with steam, the bell may be internally and/or externally lined by thermal insulant 58 in order to reduce convection movements of steam within the bell. In a similar manner, thermal insulant 59 may be provided at the inlet of pipes 44 and 46 into pool 11.

Figure 4:
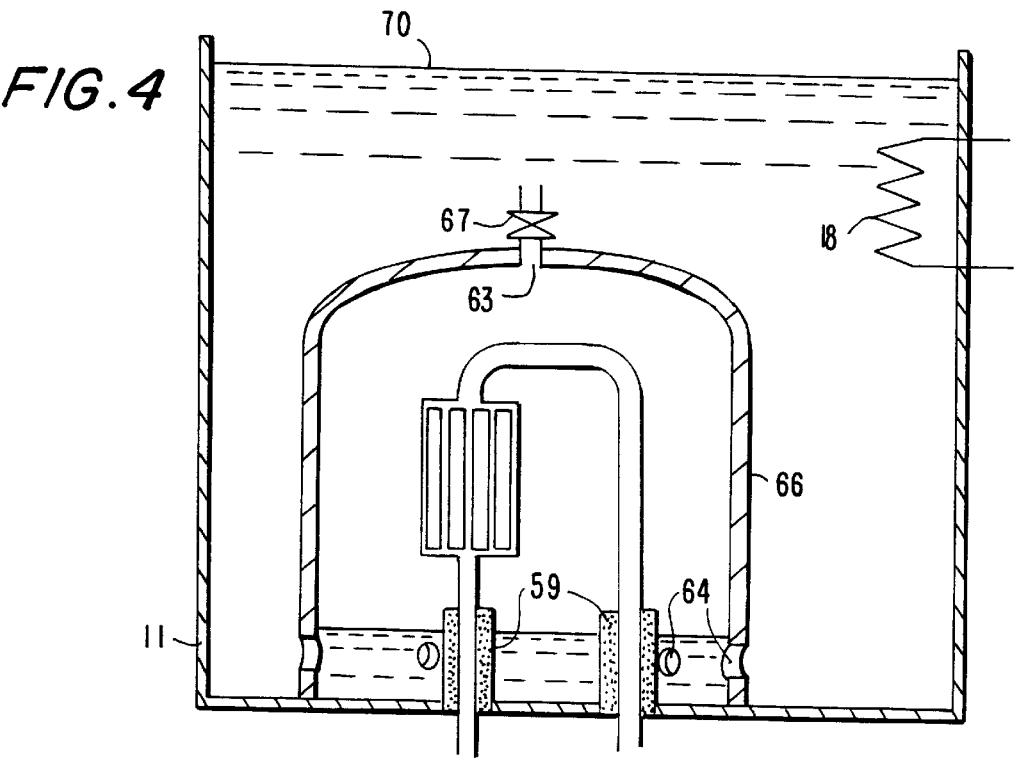
FIG. 4 is a cross-sectional view of a pressurized water reactor residual power evacuation system of a fourth embodiment of the invention.

In the embodiments shown in FIG. 2 and FIG. 3, the container, i.e., the bell, has been shown without any support. It should be understood, however, that the bell can be maintained in any desired random manner, e.g., in the manner as shown in FIG. 4. It may be attached to the pool by its lower part with the aid of fasteners, e.g., screws, or with welds, or other manner as desired. In the case of such attachment, the opening in the lower part of the bell (i.e., 29 and 62 in FIG. 2 and FIG. 3, respectively) is no longer a ring-like space, but instead consists of a series of openings 64 in the lower part of the container (or bell) 66, as shown in FIG. 4. Reference numeral 59 designates a thermal insulant at the intake of the pipes into the pool, while reference numerals 63 and 67 designate an opening and a valve, respectively in the upper part of container 66.

Valve 67 is of a variable nature. For precise applications, e.g., for nuclear reactors requiring reliable systems, several valves may be arranged in parallel. As the need arises, the desired setting for power extraction may be accomplished by a partial opening of the valve or multiplicity of valves. Here again for security purposes, if the need arises, the valves can be designed to open automatically in the case of a failure of supply of control fluid or electricity.

In order to insure good natural convection of the fluid in the pool and, as shown in FIG. 4, the outlet of valve 67 can be located beneath the free level 70 of the pool. However, if for any reason, the outlet of valve 67 is not or is no longer located beneath the level 70, the "thermal valve" is still operational. Under such conditions, the fluid contained in pool 11 would exit in vapor form if the temperature level so permitted and would be discharged to the outside of the pool.

Figure 5:
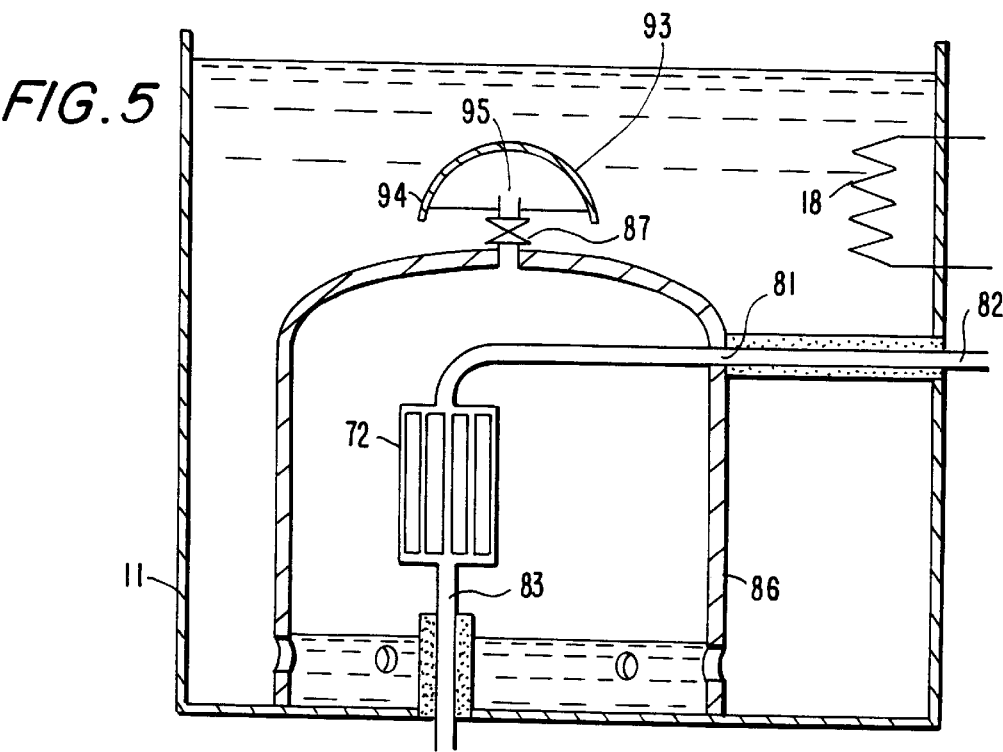
FIGS. 5–9 are cross-sectional views of various additional embodiments of the invention.

FIGS. 2 to 4 show the "thermal valve" employed in the method of the invention with the heat exchanger and its incoming and outgoing supply pipes penetrating the bell through the lower part of the pool. Such arrangement has been designed for simplicity purposes. However, if for any reason, and as illustrated in FIG. 5, the supply pipe(s) 82 must enter container 86 through its side or top, the "thermal valve" would still be operational. However, in order to maintain a good level of efficiency for the "thermal valve", the pipe(s) 81 through container 86 should have a minimum degree of leakage between the interior of bell 86 and the water of pool 11.

If, for certain operating conditions, it is necessary for valve 87 to have a large cross-sectional passageway, it could happen that water enters through such valve when the power to be removed is well below the power level for which the "thermal valve" has been dimensioned. Thus, at a low power level, the vapor flow rate will be low and the water of pool 11 can enter bell 86 through valve 87, while the vapor concurrently exits through the same valve. The vapor will then flow in an upward direction, while the water will flow in a downward direction. If avoidance of such countercurrent flow in the valve is desired, it is possible to position a small bell 93 above valve 87, as is shown in FIG. 5, so that the bottom 94 of bell 93 is below outlet 95 of valve 87. Bell 93 creates a baffle for the vapor or steam, preventing any re-entry of the cold water of pool 11.

Figure 6:
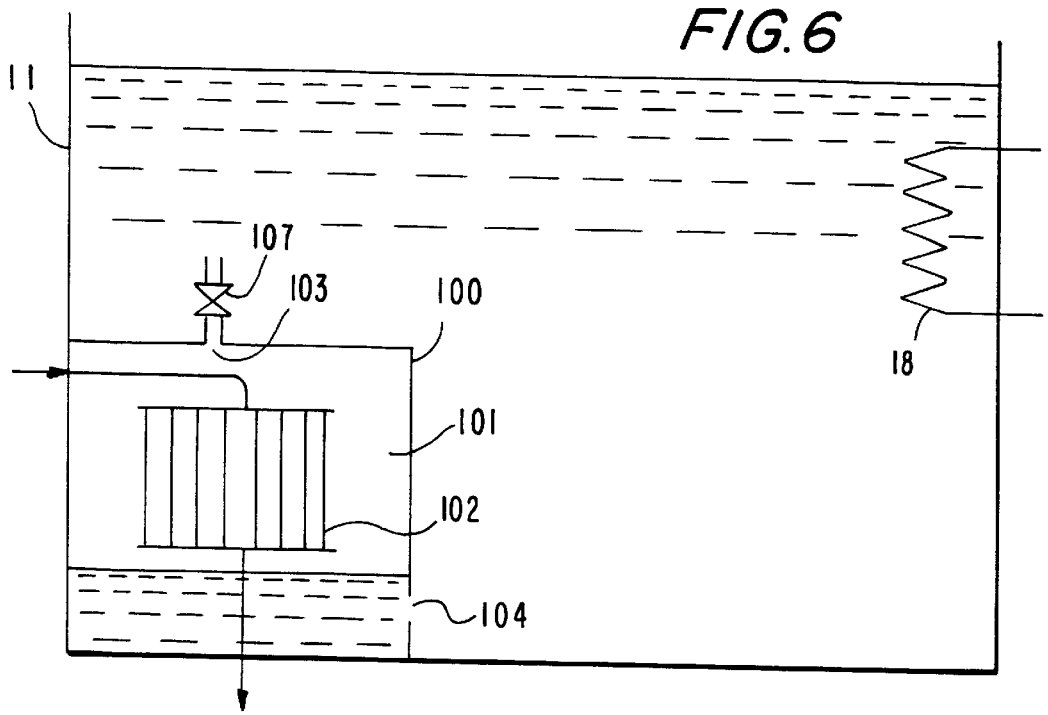

There is no significant operational criticality to the shape or volume of the inverted tank, i.e., the container. All that is necessary is that it be capable of confining the heat exchanger and the vapor bubble for the modification of the heat exchange coefficient. The thermal valve" employed in the method of the present invention is operational independent of the construction of the inverted tank. Thus, if for any reason, compartmentalization of the pool is required, one of the compartments could fulfill the function of the inverted tank (i.e., the container) as shown in FIG. 6. FIG. 6 depicts partitions 100 for forming a compartment 101 having a heat exchanger 102. Compartment 101 has at least two openings 103 in its upper part surmounted by valves 107 and 104 in the lower part of the compartment. Thus, compartment 101 fulfills the same function as inverted tank 26 or 56 of FIG. 2 or FIG. 3, respectively.

Figure 7:
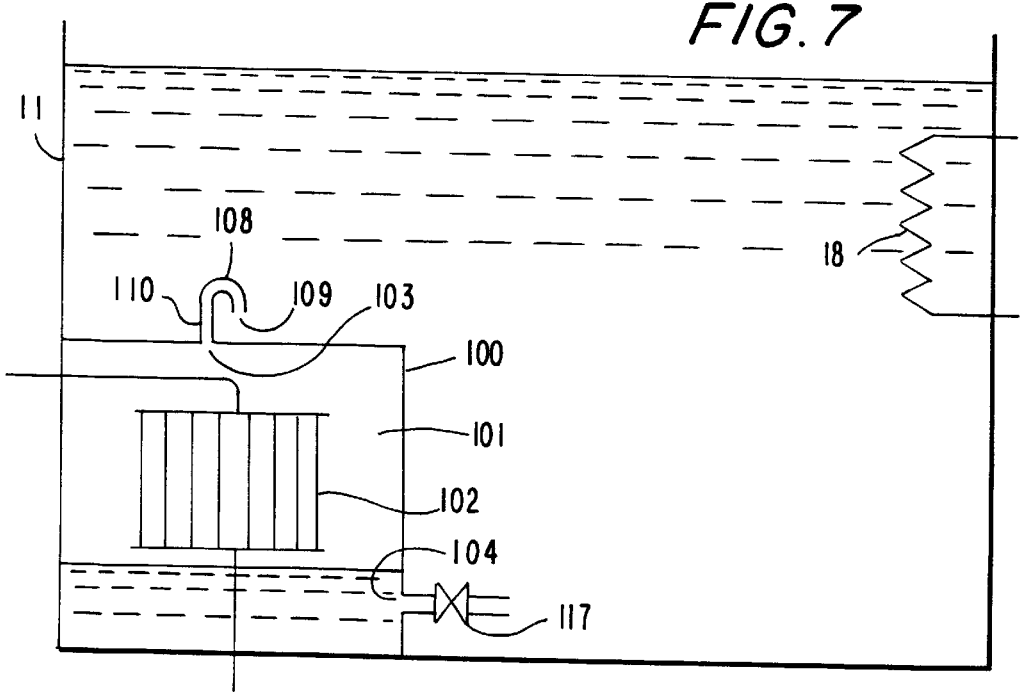

If for any reason it is not possible to position valve 107 at the top of the inverted tank or the compartment 101, it can be positioned directly at the intake of the opening(s) in the lower part, as shown in FIG. 7. In order to avoid the entry of any water through the upper opening, it is possible to use the device 93 shown in FIG. 5, or a pipe 110 bent in the shape of a gunstock, as shown in FIG. 7. For efficiency purposes, it is preferred that outlet 109 of pipe 110 be located lower than bend 108. With valve 117 placed in the lower part, the operation of the resultant device is similar to that where valve 107 is placed in the upper part. When valve 117 is closed, fluid contained in the compartment is heated on contact with heat exchanger 102 and is transformed into steam, assuming the temperature and pressure conditions would so permit, thereby significantly reducing heat exchange as is the case with the inverted tank described in FIGS. 2 to 5. Return to a good heat exchange coefficient will re-occur by opening valve 117.

Figure 8:
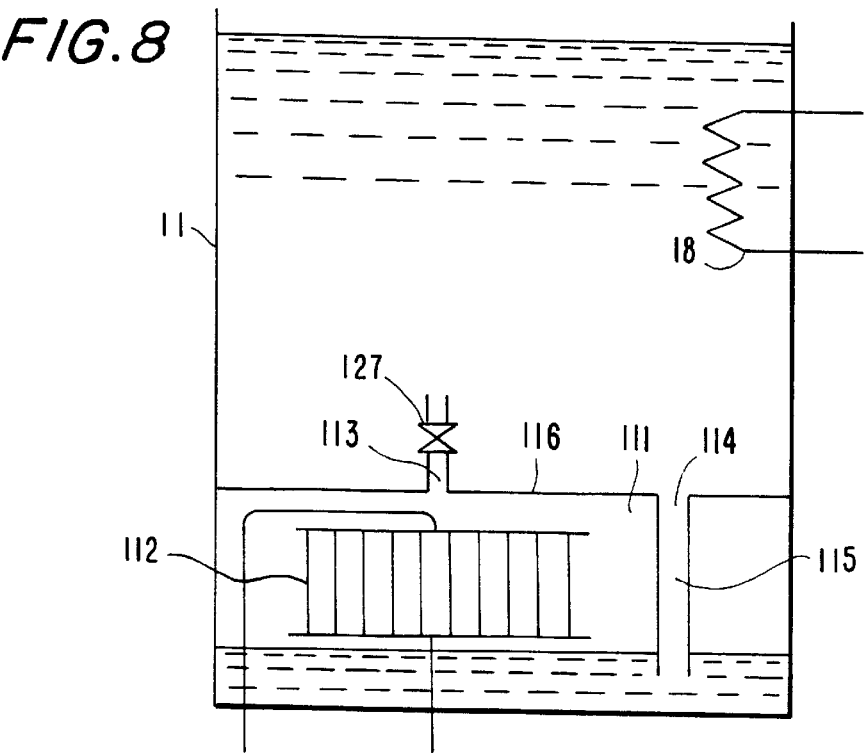
Figure 9:
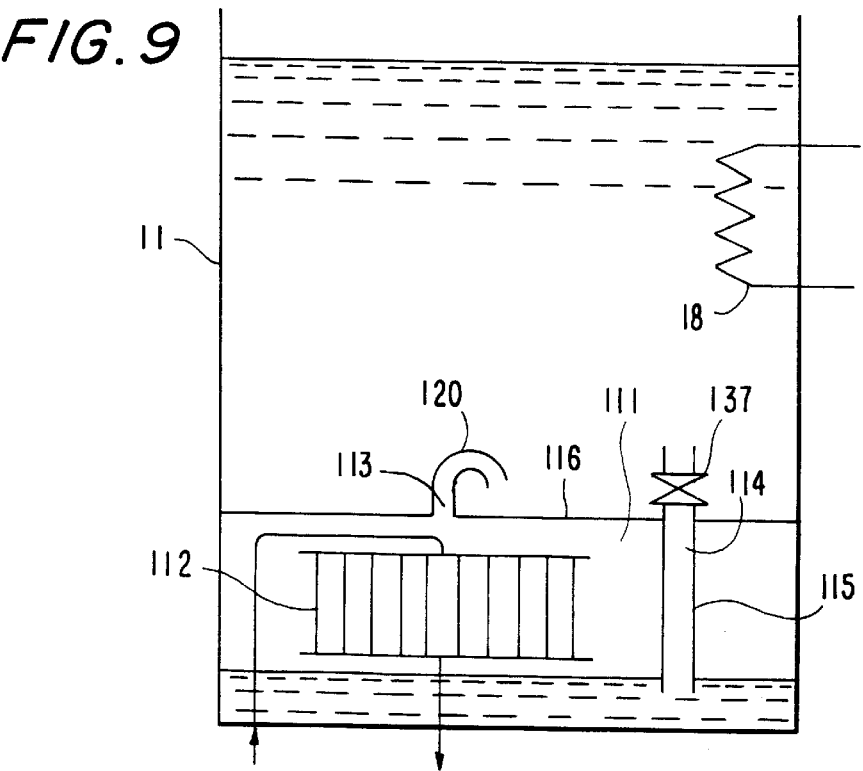

A special arrangement of the opening through which water of the pool enters the compartment is possible if the opening cannot be located in the lower part. Thus, as shown in FIGS. 8 and 9, there may be a compartment 111 having heat exchanger 112 at the bottom of pool 11. The openings 113 and 114 are located in the upper part of compartment 111 defined by partition 116. Intake opening 114 is connected to tube 115 in the interior of the compartment for supplying water from the pool to the bottom of the compartment. A mechanical valve for controlling the heat flux can be located on one of the openings, as is shown by valve 127 in FIG. 8 or valve 137 in FIG. 9. If the valve is positioned on the intake opening 114, device 120, similar to device 110 of FIG. 7, must be used to prevent the water from entering through outlet opening 113. Alternatively, a device such as bell 93 of FIG. 5 can be used, in which case its opening would be directed towards the opening of the upper part 113 of the compartment, and a pipe fixed at the outlet of such opening would issue into the internal space of the bell. In the above description, for simplicity purposes, only a single valve at the inlet or outlet of the compartment or a single pipe 115 has been shown. However, the "thermal valve" and its use in the method of the present invention will not be adversely affected if it is deemed necessary to employ several valves or pipes instead.

The "thermal valve" employed in the method of the present invention has been applied to water reactor systems operating at a high temperature of 250 to 300° C. leading to the formation of a vapor or steam bubble beneath the inverted tank, i.e., the bell. For other applications or in the case of reactors operating at lower temperatures, no vapor bubble is formed, the "thermal valve" would still be operational. Thus when the valve is closed, the liquid contained in the bell heats up and tends to rise by natural convection. This hot liquid cannot escape from the bell, because the valve is closed. The temperature attained by such liquid than corresponds to the temperature of the coolant flowing in the heat exchanger. As a consequence, heat exchange ceases, and resumes when the valve is again opened.

What is claimed is:

1. A method for controlling heat exchange in a nuclear reactor comprising the steps of:

circulating a heated liquid through a conduit forming a closed loop extending from a heat exchanger in the nuclear reactor to at least one other heat exchanger immersed in a pool of relatively cold liquid located external of the nuclear reactor;

confining said at least one other heat exchanger within a container immersed in said pool of liquid, said container having an upper part forming an area surrounding said at least one other heat exchanger and an open lower part through which the liquid of said pool may freely pass;

forming a passageway in said upper part of said container to permit communication through said passageway from said area surrounding said at least one other heat exchanger and said pool; and controlling the opening and closing of said passageway such that when the passageway is closed a vapor is formed in said area inhibiting further heat exchange with the heated liquid in the conduit and when the passageway is open heat exchange is maximized.

2. The method of claim 1, wherein said passageway forms an outlet located in the upper part of the container and controlling the opening and closing of the outlet using a thermal valve.

3. The method of claim 2 wherein at least two valves arranged in a parallel manner are located at said outlet.

4. The method of claim 2 wherein said open lower part of the container comprises one or more openings in said container for communicating with said pool.

5. The method of claim 1 wherein the heat exchanger contains a fluid entrance pipe and a fluid outlet pipe, said entrance and outlet pipes penetrating the lower part of the container.

6. The method of claim 5 wherein the fluid entrance pipe and the fluid outlet pipe are thermally insulated.

7. The method of claim 5 comprising using said loop for carrying a fluid, said loop being connected to: (a) the fluid entrance pipe through which a fluid is passed into the heat exchanger and (b) the fluid outlet pipe through which the fluid exits from the heat exchanger.

8. The method of claim 7 comprising using a pump in communication with the loop.

9. The method of claim 7 comprising using an expansion tank in communication with the loop, thereby causing any fluid present in the loop to be maintained under pressure.

10. The method of claim 1 wherein the heat exchanger contains a fluid entrance pipe and a fluid outlet pipe located such that the fluid entrance pipe and/or the fluid outlet pipe penetrate through a side or the top of the container.

11. The method of claim 10 wherein the fluid entrance pipe and the fluid outlet pipe are thermally insulated.

12. The method of claim 10 comprising using said loop for carrying a fluid, said loop being connected to: (a) the fluid entrance pipe through which a fluid is passed into the heat exchanger and (b) the fluid outlet pipe through which the fluid exits from the heat exchanger.

13. The method of claim 12 comprising using a pump in communication with the loop.

14. The method of claim 12 comprising using an expansion tank in communication with the loop, thereby causing any fluid present in the loop to be maintained under pressure.

* * * * *